(12) United States Patent
Molino

(10) Patent No.: US 10,139,299 B2
(45) Date of Patent: Nov. 27, 2018

(54) ELECTRONIC DEVICE FOR MEASURING THE CHARACTERISTICS OF FASTENING DEVICES

(71) Applicant: ATLAS COPCO BLM S.R.L., Paderno Dugano (IT)

(72) Inventor: Roberto Molino, Peschiera Borromeo (IT)

(73) Assignee: ATLAS COPCO BLM S.R.L., Paderno Dugnano (MI) (IT)

( * ) Notice: Subject to any disclaimer, the term of this patent is extended or adjusted under 35 U.S.C. 154(b) by 0 days.

(21) Appl. No.: 15/516,885

(22) PCT Filed: Oct. 6, 2015

(86) PCT No.: PCT/IB2015/057632
§ 371 (c)(1),
(2) Date: Apr. 4, 2017

(87) PCT Pub. No.: WO2016/055933
PCT Pub. Date: Apr. 14, 2016

(65) Prior Publication Data
US 2017/0292883 A1    Oct. 12, 2017

(30) Foreign Application Priority Data

Oct. 7, 2014  (IT) .......................... MI2014A001756

(51) Int. Cl.
*G01L 5/24* (2006.01)
*B25B 23/14* (2006.01)
*G01L 25/00* (2006.01)

(52) U.S. Cl.
CPC ................ *G01L 5/24* (2013.01); *B25B 23/14* (2013.01); *G01L 25/003* (2013.01); *H05K 999/99* (2013.01)

(58) Field of Classification Search
CPC ......... G01L 5/24; G01L 25/003; B25B 23/14; H05K 999/99

(Continued)

(56) References Cited

U.S. PATENT DOCUMENTS 5,476,014 A * 12/1995 Lampe .................... B25B 23/14
73/862.21
2008/0208522 A1* 8/2008 Lucke ................. B25B 23/1425
702/151

(Continued)

FOREIGN PATENT DOCUMENTS

| DE | 202010015259 U1 | 5/2011 |
| GB | 2273574 A | 6/1994 |
| WO | 2014/155316 A1 | 10/2014 |

OTHER PUBLICATIONS

International Search Report dated Feb. 10, 2016.
Written Opinion of the International Searching Authority dated Feb. 1, 2016.

*Primary Examiner* — Max Noori
(74) *Attorney, Agent, or Firm* — Hedman & Costigan, P.C.; James V. Costigan; Kathleen A. Costigan

(57) ABSTRACT

Electronic device for measuring the characteristics of fastening devices, comprising a box-shaped body (2) traversed by at least one cylinder (21), rotating with respect to the box-shaped body that transmits the rotary motion received by such a fastening device and a sensor capable of measuring the rotary torque and the rotation angle on said cylinder. Such a device comprises means for detecting the relative rotation between box-shaped body (2) and rotation driving cylinder (21).

3 Claims, 2 Drawing Sheets

(58) Field of Classification Search
USPC .................................................. 73/862.21
See application file for complete search history.

(56) References Cited

U.S. PATENT DOCUMENTS

2009/0114067 A1* 5/2009 Berg .................. B25B 23/14
                                                                                                 81/468
2012/0006161 A1    1/2012 Chen

* cited by examiner

ELECTRONIC DEVICE FOR MEASURING THE CHARACTERISTICS OF FASTENING DEVICES

The present invention refers to an electronic device for measuring the characteristics of fastening devices. In particular, the device of the present invention comprises at least one sensor adapted for measuring parameters such as torque, force, angle, length, etc . . . and combinations of the aforementioned parameters.

A possible field of application of such devices is that of verifying the behaviour of the fastening of industrial screwers through the measurement of the rotary and/or braking torque of the rotary shaft.

Indeed, the testing of a screwer is a procedure that provides for the performance of a sequence of fastenings for which torque and angle are measured.

Such values are used to compute the metrics on which to then apply rules to validate the capability of the screwer, by this meaning precision and repeatability.

In the state of the art numerous sensors are known that carry out such measurements (torque, force, angle, length, etc . . . ), also combined with each other and that transmit the measurement signal through a suitable cable to a data acquisition unit, which is usually intended for the conversion of the analogue or digital signal into a measurement able to be understood by the user carrying out the same measurement.

Typically, an extensometer bridge for measuring torque, force, compression, etc . . . , is applied on such sensors, rather than accelerometers, encoders for reading the angle.

The signals of the extensometers and of the angle measurement are not processed on the transducer, but through the aforementioned connection cable they are transmitted to a separate unit that will carry out the conditioning thereof and also through suitable calculation algorithms determine the relative measurement.

Moreover, on the market there are sensors capable of radio-transmitting signals relative to the measurements carried out. In such objects, the electronics provided for conditioning the signal and its radio-transmission, advantageously is already inside the sensor itself.

Moreover, sensors are known with which an electronic command and control unit of the sensors themselves is associated, able to be electrically coupled from the outside with the box-shaped body of the sensor. Such a control unit is capable of processing and radio-transmitting the data detected by the sensors.

In such systems, the control unit can be coupled, through a suitable connector, on existing sensors already present on the market, without modifying their primary functionality thus giving the possibility of making them autonomous and wireless.

The parameters that are detected by such a type of sensor are usually the rotary torque exerted by the fastening device (i.e. the screwer) and the rotation angle of the shaft.

Typically, such measuring devices are in the form of a box-shaped body traversed by a cylinder, rotating with respect to the box-shaped body through suitable bearings. Such a cylinder transmits the rotary motion from the instrument, in particular from a screwer to the screw.

At the ends of such a cylinder, means adapted for coupling the sensor itself both with the screwer and with the screw are of course provided.

On such cylinder that defines the rotation shaft, both the measurement of rotary torque and of rotation angle is carried out.

In order to carry out correct measurements it is essential to take into account the possible relative movement between the box-shaped body and the motion transmission cylinder, due to the inevitable friction that is formed between the cylinder and the box-shaped body even if low friction bearings can be used. In particular, it is essential for such measurement to be carried out at the measurement of the rotation angle.

Indeed, some tests on the screwers foresee, for example, that once a preset fastening torque is reached a further rotation of 90° is given to the screw.

Moreover, in some cases it is necessary to reach a certain fastening torque starting from a certain minimum threshold by exerting a rotation with a predetermined angle.

The graphs of FIGS. 1a and 1b represent examples of results obtained with such types of test.

All of these measurements foresee that the sensor is stationary and the rotation of the cylinder exactly corresponds to the rotation of the screwer and of the screw.

Therefore, in order to avoid such undesired relative movement occurring, there is a tendency to keep the box-shaped body mechanically stopped. In the case in which the type of sensor has a transmission cable, it is possible to use the cable itself to keep the box-shaped body stationary, using adhesive tape or similar means. Alternatively, the operator that acts on the screwer tends to keep the box-shaped body stationary simply manually. Clearly, in all of the cases indicated above the result is still unsatisfactory.

The Applicant has realised that as an alternative to the mechanical blocking of the box-shaped body, an effective way of carrying out the measurement of torque and angle is that of also monitoring the possible induced movement of the box-shaped body itself, and then through electronic processing taking into account such a contribution during the calculation of the torque and of the angle.

An aspect of the present invention concerns a measuring device having the characteristics of the attached claim 1.

The characteristics and advantages of the measuring device according to the present invention will become clearer from the following description, given as a non-limiting example, of an embodiment made with reference to the attached figures that respectively illustrate:

Figure 1A:
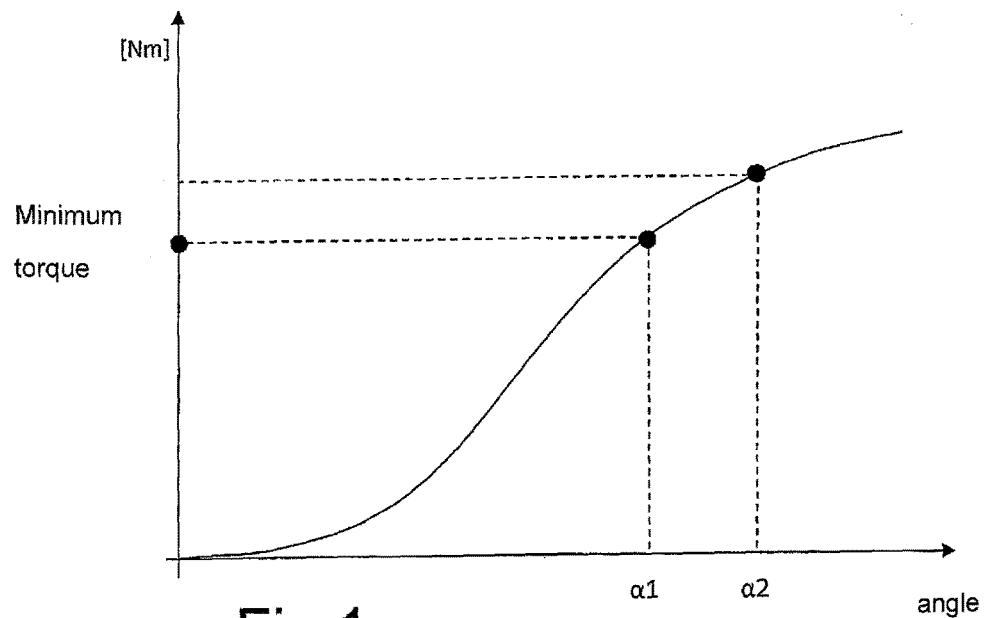
FIG. 1a is a results graph of a first type of measuring test able to be carried out with the device of the present invention.
Figure 1B:
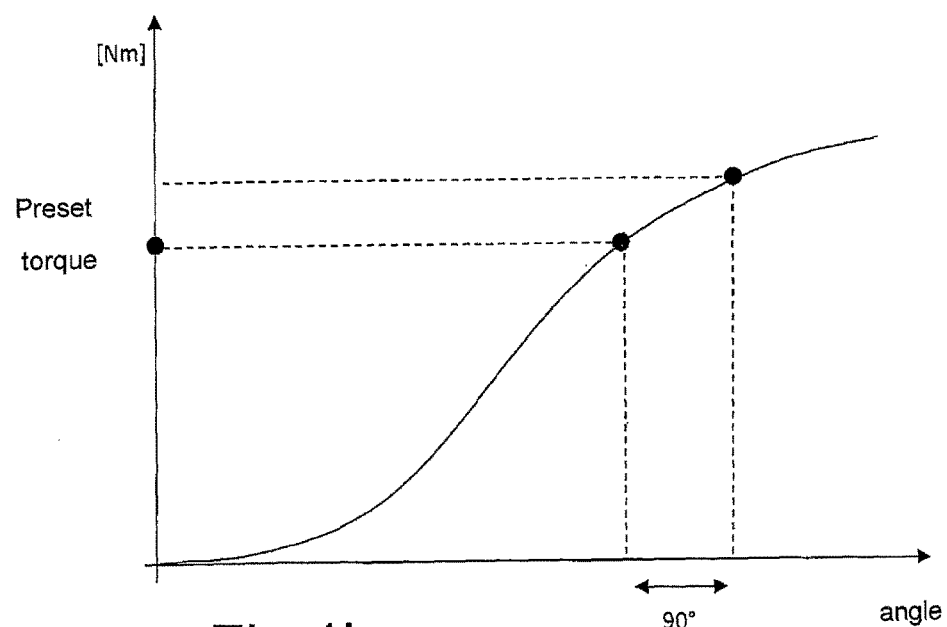
FIG. 1b is a results graph of a second type of measuring test able to be carried out with the device of the present invention.
Figure 2:
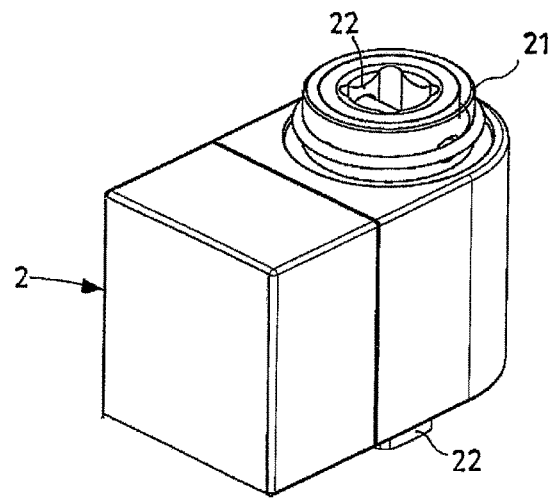
FIG. 2 is an electronic device in perspective according to the present invention.

With reference to the cited figures, the measuring device according to the present invention comprises a box-shaped body 2 traversed by a cylinder 21, rotating with respect to the box-shaped body, through suitable bearings. Such a cylinder transmits the rotary motion of the fastening device, for example from a screwer A, to a screw V.

At the opposite ends of such a cylinder, means 22 adapted for coupling the sensor itself both with the screwer and with the screw are of course provided.

Upon the movement of such a cylinder, which defines the rotation shaft, both the measurement of rotary torque and of rotation angle are carried out.

Such measurements are carried out for example through strain gauges for measuring torque, force, compression, etc . . . rather than encoders for measuring the rotation angle of the cylinder.

According to the present invention, such a measuring device also comprises means for detecting the relative rotation between box-shaped body 2 and cylinder 21 for transmitting the rotation.

Preferably, such detection means comprise at least one gyroscope.

In a first embodiment of the present invention (FIG. 3a) such a box-shaped body is associated with an electrical connector 23, in which a unit 24 for controlling the measurement of the sensor engages, which comprises at least one electronic command and control board for said sensor, with which radio transmission means (for example by wi-fi or bluetooth) of the data detected by the sensors, to such a central unit U are associated.

In a second embodiment of the present invention (FIG. 3b), on such a box-shaped body there is an electrical connector 23 in which a connection cable C between the measuring device and a central processing unit U engages.

Such detection is suitably considered, when at the moment of measurement of the rotation angle through the encoders, it is necessary to verify whether such a measurement is "compromised by a possible rotation of the box-shaped body with respect to the cylinder, due to the inevitable contribution of the friction existing between cylinder and bearings.

The contribution of the detection of the gyroscope is subtracted from the detection of the angle carried out by the encoder in order to detect a more reliable measurement of the actual rotation angle of the fastening instrument.

Figure 3A:
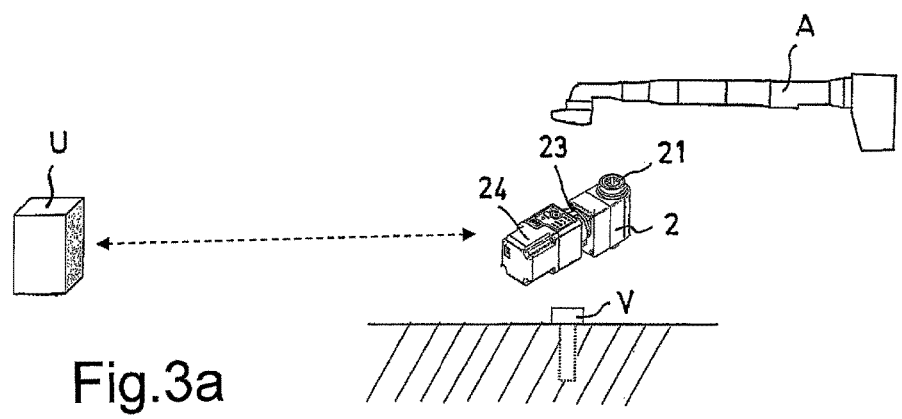
FIG. 3a is a radio connection network between a device according to the present invention and a central apparatus.
Figure 3B:
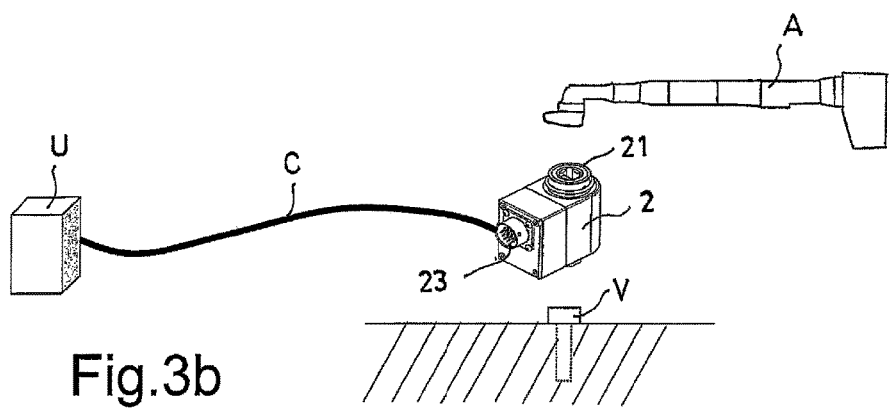
FIG. 3b is a cable connection network between a device according to the present invention and a central apparatus.

Such processing can be carried out both on board the sensor, for example in the embodiment of FIG. 3a, in which there is a local processing unit, and in the central unit U, like for example in the embodiment of FIG. 3b where the signals are directly sent to such a unit U.

The invention claimed is:

1. Electronic device for measuring the characteristics of an industrial screwdriver comprising:
   at least one box-shaped body (2) traversed by at least one cylinder (21), adapted to rotate with respect to the box-shaped body which transmits the rotary motion received by said screwdriver,
   at least one sensor capable of measuring the rotary torque and the rotation angle on said cylinder,
   means for detecting the relative rotation between the box-shaped body (2) and the rotation driving cylinder (21) comprising at least one gyroscope and a control unit (24) for controlling said at least one sensor, said control unit (24) comprising at least one command and control electronic board for commanding and controlling said at least one sensor, said command and control electronic board (24) having transmission means for transmitting via radio the data detected by said at least one sensor to a central unit (U),
   wherein an electrical connector (23) is associated with said box-shaped body (2) and said electrical connector (23) is fitted into said control unit (24) whereby said electronic device measures the rotary torque and rotation angle of said industrial screwdriver.

2. Device according to claim 1 wherein the measured value of the relative rotation between the box-shaped body and the cylinder is subtracted from the detected value of the rotation angle of the cylinder with the aim of detecting a more reliable measurement of the industrial screwdriver.

3. Device according to claim 1 wherein on such box-shaped body an electric connector (23) is present, in which a connection cable (C) is fitted between the measuring device and a central processing unit (U).

* * * * *